United States Patent

Iwata et al.

[11] Patent Number: 6,153,301
[45] Date of Patent: Nov. 28, 2000

[54] MICA TAPE AND INSULATED COIL USING THE SAME

[75] Inventors: Noriyuki Iwata, Sagamihara; Hisayasu Mitsui; Hiroshi Hatano, both of Yokohama; Hideaki Nakatsu, Kanuma; Takuo Yoshida, Tochigi-ken, all of Japan

[73] Assignees: Kabushiki Kaisha Toshiba, Kawasaki; Nippon Rika Kogyosho Co., Ltd., Tokyo, both of Japan

[21] Appl. No.: 08/955,241

[22] Filed: Oct. 21, 1997

[51] Int. Cl.[7] ............... B32B 5/16; B32B 9/00; B32B 15/02; B32B 17/02

[52] U.S. Cl. ............ 428/406; 428/404; 428/524; 428/325; 428/327; 428/363; 428/364; 428/454; 428/378; 310/179

[58] Field of Search ................... 428/324, 325, 428/327, 363, 364, 454, 378, 403, 404, 406; 310/179

[56] References Cited

U.S. PATENT DOCUMENTS 3,523,061  8/1970  Purvis .
5,274,196  12/1993  Weinberg .

FOREIGN PATENT DOCUMENTS 0 406 477   1/1991   European Pat. Off. .
2 013 311   3/1970   France .
54-007200   1/1979   Japan .
62-45687    9/1987   Japan .
1-47002    10/1989   Japan .
8-279410   10/1996   Japan .

OTHER PUBLICATIONS

Patent Abstracts of Japan, vol. 97, No. 2, Feb. 28, 1997, JP 08 279410, Oct. 22, 1996.

*Primary Examiner*—Deborah Jones
*Assistant Examiner*—Wendy Boss
*Attorney, Agent, or Firm*—Oblon, Spivak, McClelland, Maier & Neustadt, P.C.

[57] ABSTRACT

A mica tape formed by a paper-making process from a mixture of the mica particles and at least one selected from the group consisting of a short fiber made of a nitrogen-free organic material and a short fiber made of an inorganic material, and an insulated coil by winding the mica tape around a conductive coil and impregnating the mica tape with a solventless thermo-setting resin. The short fiber has an average diameter of 0.1 to 20 μm and an average length of 0.5 to 10 mm.

2 Claims, 1 Drawing Sheet

MICA TAPE AND INSULATED COIL USING THE SAME

BACKGROUND OF THE INVENTION

The present invention relates to a mica tape for an insulated coil used in electrical equipment such as rotating electric machinery, and also relates to an insulated coil. More particularly, the present invention is concerned with a mica insulated coil formed by a vacuum-pressure impregnation.

The insulated coil for use in high voltage rotating machinery is generally manufactured by steps of winding mica around a coil, impregnating the mica with a solventless thermosetting resin by a vacuum-pressure impregnation, and curing the resin with heat. As the mica tape employed in manufacturing such an insulated coil, a mica paper or an aramid fibrid mica paper has been used. The mica paper is formed, by a paper-making process, from fine mica particles and water alone. The aramid fibrid mica paper (hereinafter, referred to as "aramid mica") is formed, by mixing 5±3 wt % of aromatic polyamide pulpy particles (hereinafter, referred to as "fibrid") in fine mica particles and subjecting the resultant mixture to a paper-making process, as described in Jpn. Pat. Appln. KOKOKU Publication Nos. 43-20421 and 1-47002.

The aramid mica contains fibrid, which is present among fine mica particles. Since the fibrid takes hold of the fine mica particles, the resultant aramid mica insulated tape is excellent in mechanical strength, heat resistance, and impregnation properties, as compared to a mica paper tape containing no fibrid.

As described above, the excellent insulation properties can be attained together with excellent heat resistance and impregnation properties by mixing the fibrid to the fine mica particles and subjecting the mixture to a paper-making process. However, the aramid mica has a problem in that it contains an aromatic polyamide. The aromatic polyamide is known to generate toxic hydrogen cyanide when it burns, since it contains nitrogen in its structural formula (see, for example, Proceedings of Electric & Electron Insulation Conf. 1987. VOL. 18th Page 181–187).

Therefore, when an insulated coil is manufactured by winding the aramid mica around a coil and impregnating the aramid mica with a solventless thermosetting resin in pressurized vacuum conditions, the insulated coil also generates the toxic hydrogen cyanide when it burns. The toxic hydrogen cyanide will be a significant problem to workmen's health. This problem makes it difficult to design a pollution-free recovering process of the conductive material from the insulated coil in order to obtain a recycle resource.

BRIEF SUMMARY OF THE INVENTION

An object of the present invention is to provide a mica tape generating no toxic hydrogen cyanide when it burns, and having high heat resistance, high impregnation properties, and excellent insulation properties.

Another object of the present invention is to provide an insulated coil formed by using the mica tape generating no toxic hydrogen cyanide when it burns, and having high heat resistance, high impregnation properties, and excellent insulation properties.

According to the present invention, there is provided a mica tape formed by a paper-making process from a mixture of fine mica particles and at least one selected from the group consisting of a short fiber made of a nitrogen-free organic material and a short fiber made of an inorganic material having an average diameter of 0.1 to 20 $\mu$m.

According to the present invention, there is provided a mica tape formed by a paper-making process from a mixture of fine mica particles and at least one selected from the group consisting of a short fiber made of a nitrogen-free organic material and a short fiber made of an inorganic material having an average length of 0.5 to 10 mm.

According to the present invention, there is provided a mica tape formed by a paper-making process from a mixture of fine mica particles and at least one selected from the group consisting of a short fiber made of a nitrogen-free organic material and a short fiber made of an inorganic material, the surface of the fiber being treated with a surface active agent.

According to the present invention, there is provided an insulated coil comprising a conductive coil and a mica tape wound around the conductive coil, wherein the mica tape is formed by a paper-making process from a mixture of fine mica particles and at least one selected from the group consisting of a short fiber made of a nitrogen-free organic material and a short fiber made of an inorganic material having an average diameter of 0.1 to 20 $\mu$m, and the mica tape is impregnated with a solventless thermosetting resin.

According to the present invention, there is provided an insulated coil comprising a conductive coil and a mica tape wound around the conductive coil, wherein the mica tape is formed by a paper-making process from a mixture of fine mica particles and at least one selected from the group consisting of a short fiber made of a nitrogen-free organic material and a short fiber made of an inorganic material having an average length of 0.5 to 10 mm, and the mica tape is impregnated with a solventless thermosetting resin.

According to the present invention, there is provided an insulated coil comprising a conductive coil and a mica tape wound around the conductive coil, wherein the mica tape is formed by a paper-making process from a mixture of fine mica particles and at least one selected from the group consisting of a short fiber made of a nitrogen-free organic material and a short fiber made of an inorganic material, the surface of the short fiber is treated with a surface active agent, and the mica tape is impregnated with a solventless thermosetting resin.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
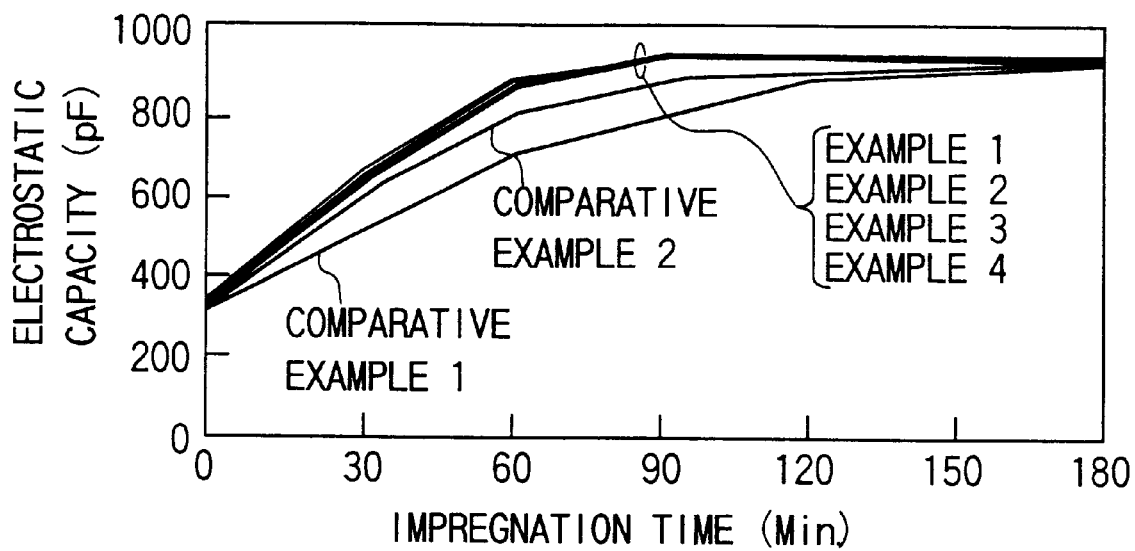
FIG. 1 is a graph showing the impregnation properties of the insulated coil with a resin, according to examples of the present invention as compared to those of comparative examples.

The mica tape according to the present invention is characterized in that it is produced by mixing fine mica particles and a short fiber made of an inorganic material or a short fiber made of a nitrogen-free organic material, and subjecting the resultant mixture to a paper-making process.

Examples of the short fiber made of an inorganic material, suitable for use in the mica tape of the present invention include short fibers made of E glass (electrical glass), S glass (high strength glass), silica glass, alumina, and the like. Suitable examples of the short fiber made of a nitrogen-free organic material include short fibers having an excellent heat resistance, made of polyethylene terephthalate, polyethylene naphtharate, polyether sulfon, polyphenylene ether, and the like.

The diameter of these short fibers is preferably from 0.1 to 20 $\mu$m, and more preferably, from 1 to 10 $\mu$m. When the diameter of the short fiber is less than 0.1 $\mu$m, the impregnation properties may be lowered. When the diameter exceeds 20 $\mu$m, it may be difficult to produce a tape form since water dispersion of the fiber is low.

The length of the short fiber is preferably from 0.5 to 10 mm, and more preferably, from 3 to 6 mm. When the length of the short fiber is less than 0.5 mm, it may be difficult to form clearances between the fine mica particles in the mica tape. When the length exceeds 10 mm, water-dispersion of the fiber may be low, with the result that the fiber may be easily agglomerated.

The amount of the short fiber is preferably from 0.5 to 20 wt %, and more preferably, from 3 to 15 wt % based on the mica paper. When the amount of the short fiber is less than 0.5 wt %, it may be difficult to obtain excellent mechanical strength, heat resistance, and impregnation properties. When the amount exceeds 20 wt %, the dispersion property of the short fiber in the fine mica articles may deteriorate, with the result that the short fiber may be easily agglomerated.

The surface of the short fiber is preferably treated with a surface active agent. If the surface of the short fiber is treated with a surface active agent, susceptibility of the fiber to a resin is improved. As a result, the strength of adhesion interface between the short fiber and the impregnating resin is enhanced, thus improving electrical characteristics such as tan$\delta$ (dielectric loss)-voltage properties of the resultant insulated coil.

Examples of usable surface active agent include fluorine-base surface active agent having a perfluoroalkyl group, amine salt type cationic surface active agent, and the like.

The mica tape of the present invention is manufactured as follows:

First, a mica ore is calcinated at, for example, 700 to 1000° C., to remove foreign materials, and crushed into pieces of a predetermined size. Then, jet water is applied to the mica pieces, thereby obtaining fine mica particles. To the fine mica particles thus obtained, the aforementioned short fiber is added. The mixture is blended in water, leading to a mica-fiber dispersion solution.

Thereafter, the dispersion solution is subjected to a paper-making process to make a paper on a cloth and dried to obtain a mica paper. On one surface of the obtained mica paper, a glass-fiber cloth (serving as a backing material) is bonded with an adhesive agent. As a result, the mica tape is formed.

Using the mica tape thus obtained, the insulated coil is obtained as follows.

First, the mica tape is wound around a coil formed of a conductive material in a predetermined number of times in a partly overlapped fashion. Second, the coil wound with the mica tape is impregnated with an impregnating resin in pressurized vacuum conditions. Then, the impregnating resin is cured by heating it to 130 to 180° C. In this manner, the insulated coil is obtained.

Examples of the impregnating resin for use in obtaining the insulated coil include an epibis-series epoxy resin, cycloaliphatic epoxy resin, and the like.

Since the insulated coil of the present invention thus obtained uses a mica tape produced from the mixture of fine mica particles and a short fiber made of an inorganic material, harmful hydrogen cyanide will not be generated when it burns. Furthermore, since the mica tape used in the present invention is obtained by a paper-making process from a mixture of the fine mica particles and a short fiber made of an inorganic material of 0.1–20 $\mu$m diameter and 0.5–10 mm length or a short fiber made of a nitrogen-free organic material, the short fiber pieces of the inorganic or the organic material are dispersed in the mica fiber, solution. As a result, clearances are formed between the fine mica particles, facilitating the permeation of the resin into the fine mica particles. Impregnation of the mica tape with the resin is thereby improved. Further improvements: reduction of impregnation time, impregnation with a high-viscosity resin, and permeation of a resin into a thick insulation layer for obtaining an insulated coil for high-voltage use, can be attained.

Furthermore, when the surface of the short fiber is treated with a surface active agent having good compatibility and dispersion properties, susceptibility of the short fiber to the impregnating resin is improved. As a result, the adhesion between the short fiber and the impregnating resin is enhanced, improving electrical characteristics of the insulated coil, such as tan$\delta$ (dielectric loss)-voltage properties.

In addition, fine mica particles are held by the short fiber made of an inorganic material having high heat resistance and high rigidity or the short fiber made of an organic material excellent in heat resistance and mechanical strength. Hence, even if heat deterioration takes place during operation, no blisters are produced in the insulation layer. The dielectric strength will not be lowered.

Now, examples of the present invention will be explained below.

EXAMPLES 1 TO 4

Four types of mica tapes corresponding to Examples 1 to 4 were formed. As the mica paper, a calcinated muscorite mica paper was used. As the short fibers, inorganic fibers and organic fibers were employed which had good water-dispersion properties and blending properties in the fine mica particles and had a 0.1–20 $\mu$m diameter and a 0.5–10 mm length.

More specifically, the mica tape of Example 1 was obtained by mixing short E glass fiber pieces (3 parts by weight) having an average diameter of 6 $\mu$m and an average length of 3 mm-length and the hard calcinated muscorite mica paper (100 parts by weight), and subjecting the mixture to a paper-making process.

The mica tape of Example 2 was obtained in the same manner as in Example 1 except that the surface of the short E-glass fiber pieces was treated with a fluorine-base surface active agent having a perfluoroalkyl group (for example, F-177(trade name) manufactured by Dainippon Ink & Chemicals, Inc).

The mica tape of Example 3 was obtained by mixing short fiber pieces made of polyethylene terephthalate (15 parts by weight) having an average diameter of 20 μm and an average length of 10 mm and a hard calcinated mica paper (100 parts by weight) and subjecting the mixture to a paper-making process.

The mica tape of Example 4 was obtained in the same manner as in Example 3 except that the surface of the short fiber pieces made of polyethylene terephthalate was treated with a fluorine-base surface active agent having a perfluoroalkyl group (for example, F-177(trade name) manufactured by Dainippon Ink & Chemicals, Inc).

As Comparative Example 1, fine mica particles tape was used which was obtained by subjecting a mixture of fine mica particles and water to a paper-making process.

As Comparative Example 2, an aramid mica tape was used which was obtained by a fibrid (5 parts by weight) in the mica paper (100 parts by weight).

The six mica tapes were examined for tensile strength (test method: JIS C 2116-1992, 13), dielectric strength (test method: JIS C 2116-1992, 22), and impregnation properties (test method: JIS c 2116-1992, 24). The test results are shown in Table 1.

an epibis-series epoxy resin having a viscosity of 0.6Pa.s in pressurized vacuum conditions. Thereafter, state of impregnation was checked by measuring an electrostatic capacity of the mica insulation layer.

The results are shown in FIG. 1. The same tendency as in Table 1 is shown in FIG. 1 with respect to the impregnation time. It was confirmed that the mica tapes of Examples 1–4 can be impregnated with the resin in shorter time than those of Comparative

EXAMPLES 1 AND 2.

As a next step, each of the mica tapes of Examples 1–4 and Comparative Examples 1–2 was wound around an aluminum rectangular bar (10 mm×50 mm×800 mm) in a half overlapped fashion in a predetermined number of times. The mica tape wound bar was set on imitation slots. After the mica-tape of the bar was impregnated with an epibis-series epoxy resin in pressurized vacuum conditions, the introduced resin was cured with heat. In this manner, each of insulated coils were obtained.

The insulated coils thus obtained were checked for electrical insulation properties immediately after the formation and after being subjected to thermal degradation at 200° C.

TABLE 1

| Property | Example 1 | Example 2 | Example 3 | Example 4 | Comparative Example 1 | Comparative Example 2 |
| --- | --- | --- | --- | --- | --- | --- |
| amount of fibrid (% by weight) | 0 | 0 | 0 | 0 | 0 | 5 |
| amount of short fiber (% by weight) | 3 | 3 | 15 | 15 | 0 | 0 |
| tensile strength (N/10 mm width) | 113 | 115 | 109 | 112 | 110 | 118 |
| dielectric strength (kV) | 3.4 | 3.5 | 3.3 | 3.5 | 3.4 | 3.6 |
| impregnation property (second) | 610 | 620 | 580 | 560 | 1850 | 680 |

From Table 1, it is found that resin impregnation properties of the mica tapes of Examples 1–4 are significantly improved as compared to that of Comparative Example 1. The dielectric strength values of the mica tapes of Examples 1–4 can be virtually compared to those of Comparative Examples 1 and 2.

for 40 days. To evaluate the electrical insulation properties, a break down voltage (BVD) was measured and appearance of the insulated coil were visually observed. BDV was measured in oil at a constant elevation rate of voltage (1 kV/sec). The results of the test are shown in Table 2 below.

TABLE 2

| Property | | Example 1 | Example 2 | Example 3 | Example 4 | Comparative Example 1 | Comparative Example 2 |
| --- | --- | --- | --- | --- | --- | --- | --- |
| initial time | BDV (kV) | 56 | 58 | 55 | 57 | 49 | 55 |
| after deterioration | BDV (kV) | 51 | 53 | 50 | 52 | 40 | 49 |
| | insulating layer of coil | no blister | no blister | no blister | no blister | blister | no blister |

Then, the mica insulation layer formed on a conductive material was tested for the resin impregnation properties. Each of mica tapes (Examples 1–4 and Comparative Example 1–2) is wound around an aluminum rectangular bar (10 mm×50 mm×800 mm) in a half overlapped fashion so that the mica insulation layers of the individual bars had the same thickness. After the both ends of the wound mica tape were sealed, an electrode was provided at the center of the mica-tape wound bar. The mica tape was impregnated with BVD values of the insulated coils wound with the mica tapes of Examples 1–4 are superior to that obtained in Comparative Example 1 both at the initial time and after the thermal degradation. No blisters were observed on the insulated coil after the heat deterioration. Furthermore, tanδ-voltage properties of the coils immediately after the formation were measured. The results are shown in FIG. 2.

Figure 2:
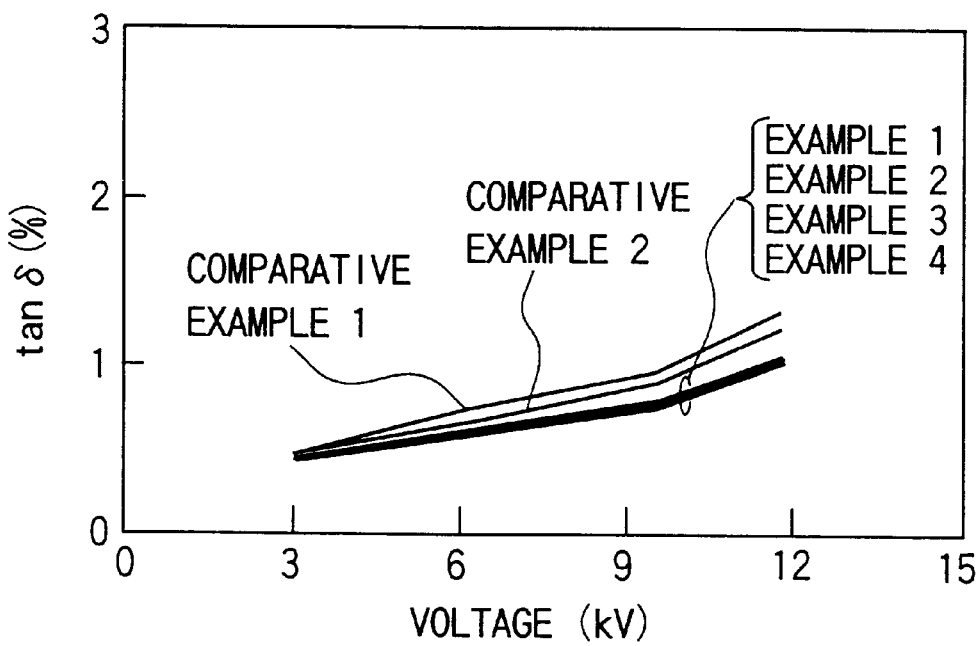
FIG. 2 is a graph showing tan$\delta$- voltage properties of the insulated coil according to examples of the present invention as compared to those of comparative examples.

As shown in FIG. 2, the insulated coils using the mica tapes of Examples 1–4 exhibit lower values of tanδ-voltage properties than those of Comparative Examples 1 and 2. This tendency was remarkable in the surface active agent treated insulated coils of Examples 2 and 4.

Thereafter, mica insulation layers were cleaved out from the insulated coils using the mica tapes of Examples 1–4 and baked in an electrical furnace at intervals of 100° C. within the temperature range of 300° C. to 800° C. The gases generated at the time of baking were collected in a collection bottle and quantitatively analyzed with respect to hydrogen cyanide. As a result, no hydrogen cyanide was detected in any one of Examples.

It was also confirmed that the same effects as those of Examples 1–4 were obtained with respect to the mica tapes formed by mixing short fiber pieces made of inorganic materials (S glass, silica glass, and alumina), or short fiber pieces made of a nitrogen-free organic materials (polyethylene terephthalate, polyether sulfon, and polyphenylene ether).

As explained in the foregoing, according to the present invention, no harmful hydrogen cyanide is generated from the mica tape when it burns, since the mica tape is formed by mixing fine mica particles with a short fiber made of an inorganic material or a short fiber made of a nitrogen-free organic material, and subjecting the mixture to a paper-making process. In addition, the short inorganic fiber pieces or the short organic fiber pieces having a predetermined shape are dispersed among the fine mica particles, with the result that clearances among them are increased. The resin is thereby facilitated to permeate in the fine mica particles. Impregnation properties can be improved. Furthermore, improvements in reduction of impregnation time, impregnation with a high-viscosity resin, and permeation of a resin into a thick insulation layer for obtaining an insulated coil for high-voltage use, can be attained. Moreover, where the surface of the short inorganic or organic fiber is treated with a surface active agent which has good compatibility and dispersion properties, susceptibility of the short fiber to the impregnating resin is improved. As a result, the adhesion between the short fiber and the impregnating resin is enhanced, improving electrical characteristics of the insulated coil.

In addition, since the fine mica particles are held by the short fiber made of an inorganic material having high heat resistance and high rigidity or by the short organic fiber excellent in heat resistance and mechanical strength, no blisters are formed in the insulation layer even if thermal degradation takes place during operation. Therefore, the dielectric strength does not decrease. The insulated coil having excellent insulation properties can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mica tape comprising mica paper which is formed by mixing fine mica particles and short fibers, and a reinforcing material bonded on the mica paper, wherein said short fibers are made of at least one selected from the group consisting of nitrogen-free organic materials and inorganic materials; and wherein surfaces of said short fibers are treated with a surfactant.

2. An insulated coil comprising a conductive coil and a mica tape wound around said conductive coil, and impregnated with a non-solvent thermosetting resin, wherein said mica tape comprises mica paper which is formed by mixing fine mica particles and short fibers, and a reinforcing material bonded on said mica paper; and wherein said short fibers are made of at least one selected from the group consisting of fibers of nitrogen-free organic materials and inorganic material; and wherein surfaces of said short fibers are treated with a surfactant.

* * * * *